Nov. 6, 1945.  P. M. RESSINGER  2,388,441
VEHICLE FOR CHILDREN
Filed Nov. 11, 1942  4 Sheets-Sheet 1

Inventor
Paul M. Ressinger
by Parker & Carter
Attorneys.

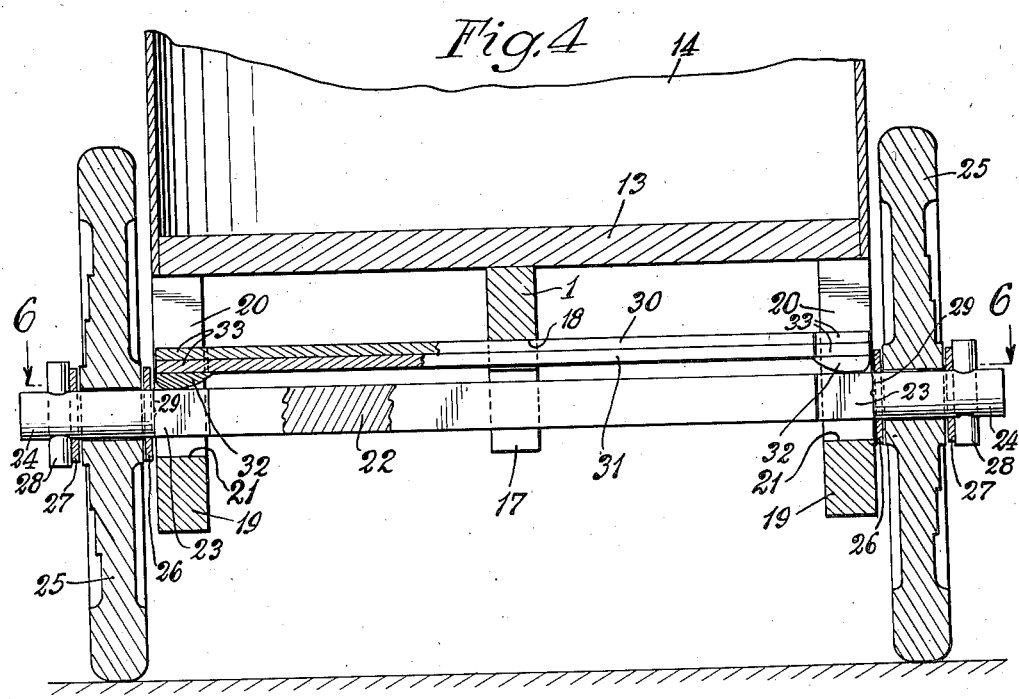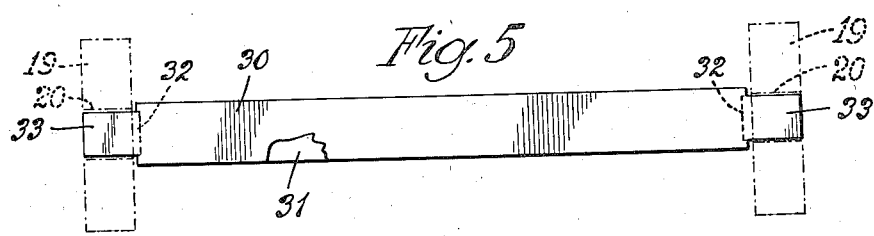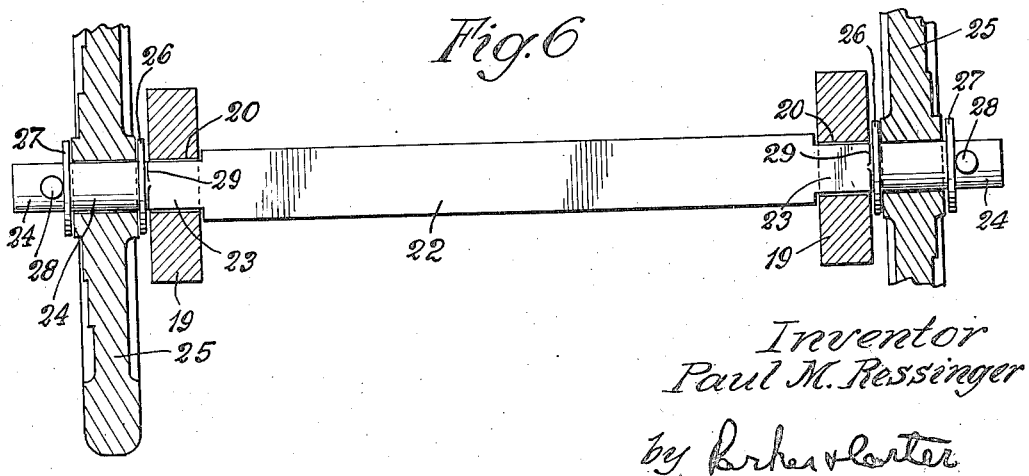

Nov. 6, 1945.   P. M. RESSINGER   2,388,441
VEHICLE FOR CHILDREN
Filed Nov. 11, 1942   4 Sheets-Sheet 3
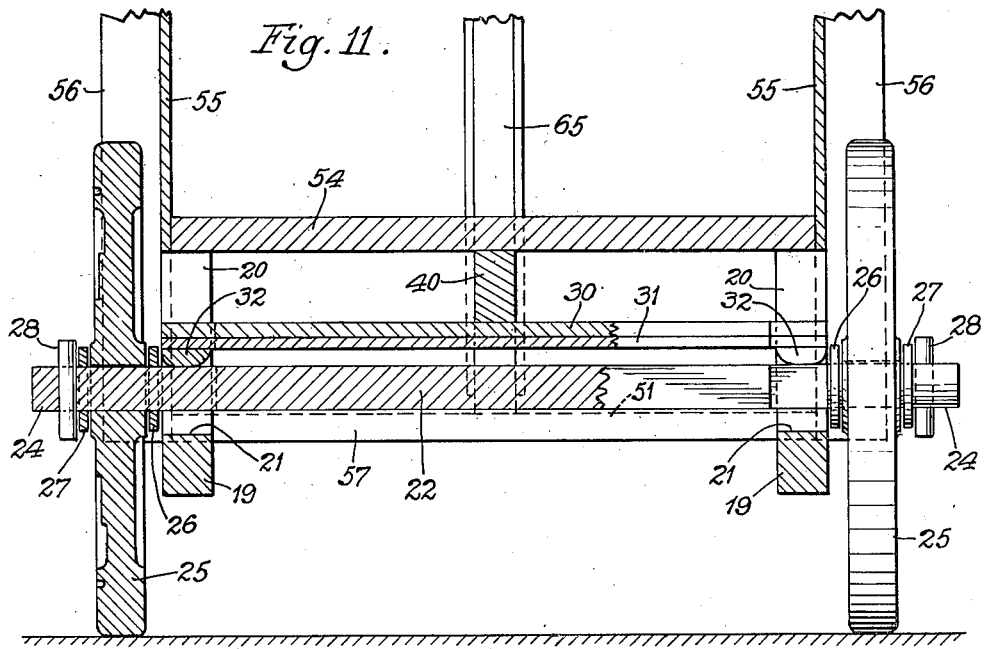
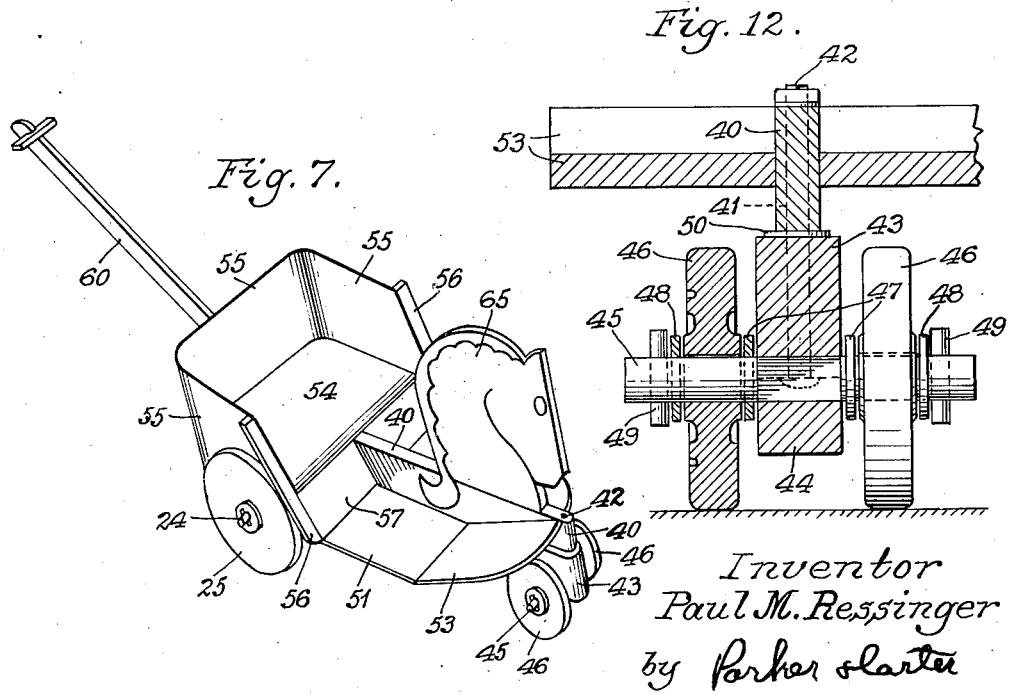
Inventor
Paul M. Ressinger
by Parker & Carter
Attorneys.

Nov. 6, 1945. P. M. RESSINGER 2,388,441
VEHICLE FOR CHILDREN
Filed Nov. 11, 1942 4 Sheets-Sheet 4
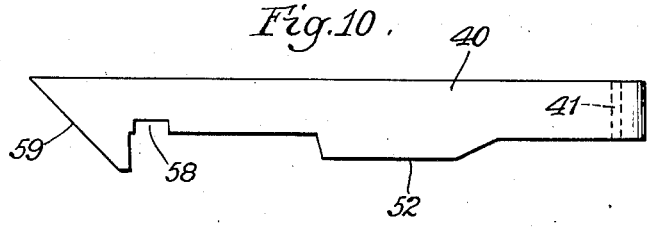
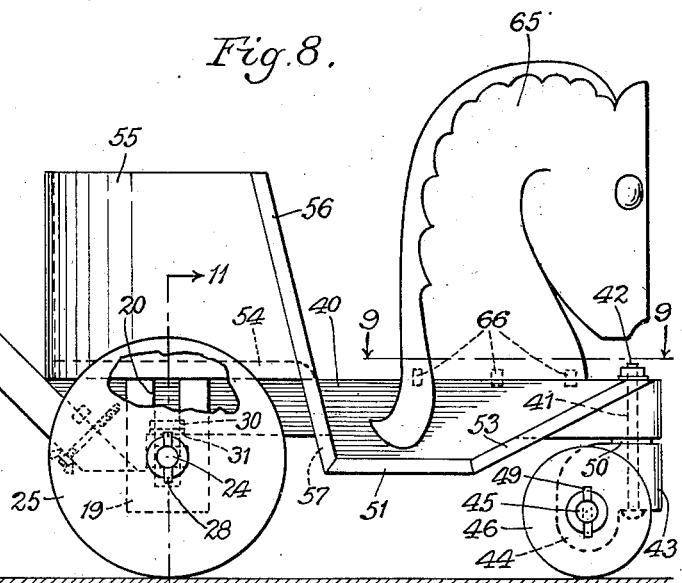
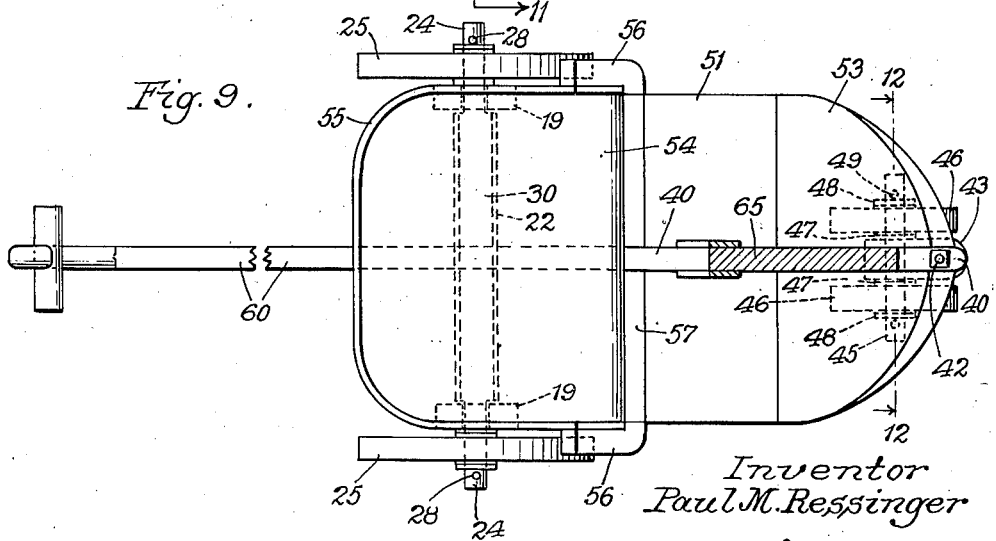
Inventor
Paul M. Ressinger
by Parker & Carty
Attorneys Patented Nov. 6, 1945

2,388,441

UNITED STATES PATENT OFFICE 2,388,441

VEHICLE FOR CHILDREN

Paul M. Ressinger, Chicago, Ill.

Application November 11, 1942, Serial No. 465,191

7 Claims. (Cl. 280—60)

My invention relates to an improvement in vehicles for children, and has for one purpose the provision of improved gocarts and the like, which shall be sightly, efficient and solid, and shall involve a minimum amount of metal in their manufacture.

Another purpose is the provision of improved spring means for such vehicles.

Another purpose is the provision of improved supporting means for such vehicles.

Another purpose is the provision of improved casters for children's vehicles, furniture, or the like, which casters employ a minimum of metal.

Other purposes will appear from time to time in the course of the specification and claims.

I illustrate my invention more or less diagrammatically in the accompanying drawings wherein:

Fig. 4 is a section on the line 4—4 of Fig. 2, on an enlarged scale;

Fig. 5 is a plan view of the spring structure shown in Fig. 4;

Fig. 6 is a section on the line 6—6 of Fig. 4;

Fig. 7 is a perspective of a variant form of the device;

Fig. 8 is a side elevation of a variant form;

Fig. 9 is a plan view with a part in section on the line 9—9 of Fig. 8;

Fig. 10 is a detail of the keel piece;

Fig. 11 is a section on the line 11—11 of Fig. 8; and

Fig. 12 is a section on the line 12—12 of Fig. 9.

Like parts are indicated by like symbols throughout the specification and drawings.

Figure 1:
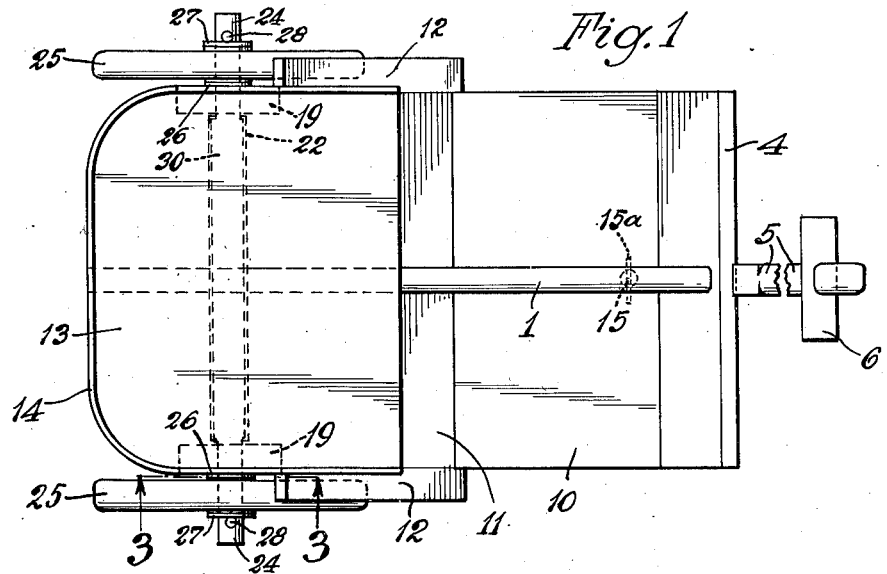
Fig. 1 is a plan view.

Referring to the drawings and referring first to the structure illustrated in Figs. 1 to 6, I generally indicates a keel piece extending from end to end of the vehicle. The forward portion has an inclined forward edge or face 2, and a corresponding rear face 3, inclined in opposition thereto, the two faces diverging upwardly from each other. Secured to the forward face 2 is a cross piece 4, and extending upwardly from the cross piece and in alignment with the keel piece 1 is a handle bar 5 of any suitable length, which may have a top handle or bale or cross piece 6 of any suitable shape.

Figure 2:
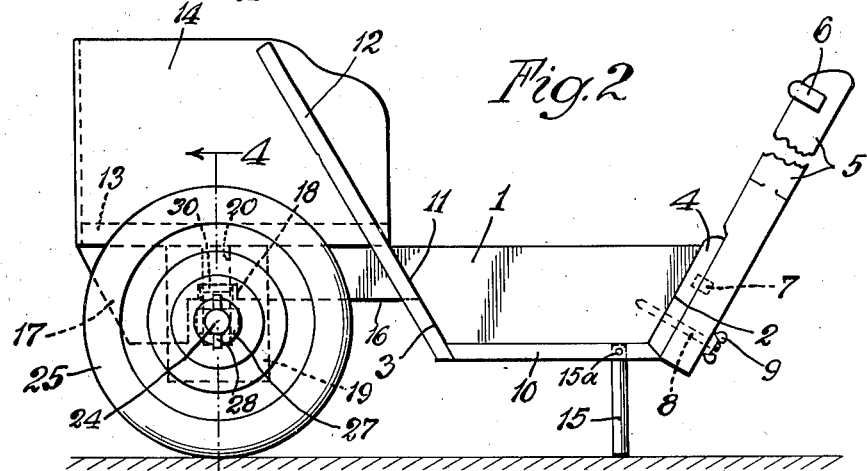
Fig. 2 is a side elevation.
Figure 3:
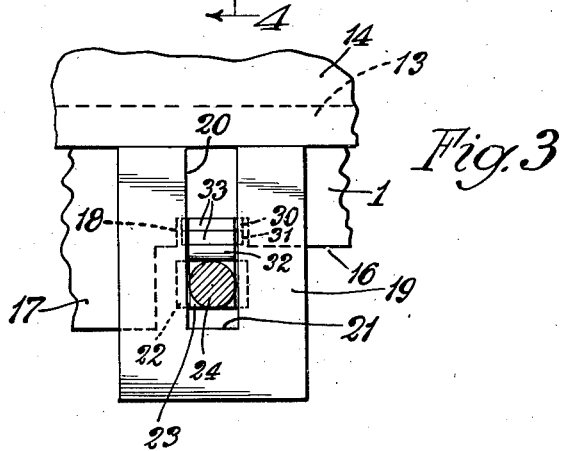
Fig. 3 is a section on the line 3—3 of Fig. 1, on an enlarged scale.

A centering member or insert 7 may be employed, received by the suitable apertures in the members 4 and 5. The handle may be secured by a bolt 8 and wing nut 9, as shown in Fig. 2. The insert 7 may consist, if desired, of a wooden doweling. The bottom piece 10 extends across the bottom of the device in contact with the bottom of the keel 1. The rear piece 11 engages the rear slope 3 of the keel 1, and the rear edge of the bottom piece 10 inclines upwardly and rearwardly, as shown in Fig. 2. It may be cut away to pass about the keel piece 1, and is provided with upwardly extending side elements 12. A seat bottom 13 rests upon the top of the rear portion of the keel piece 1 and is shown in Figs. 1, 2 and 4 as having a one-piece side member 14 extending thereabout. It will be observed that the portions 12 of the element 11 extend upwardly about the ends of the side piece 14 and may be secured thereto in any suitable manner. If desired, I may employ an abutment member 15 extending downwardly from a forward portion of the bottom piece 10.

The rear end of the keel piece has a horizontal lower surface 16 parallel with the top surface of the keel piece and a downward projection 17 at the rear end. Forwardly of the downward projection 17, the keel piece is notched, as at 18, to receive the below described spring structure.

Downwardly extending from each side of the bottom piece 13 are brackets 19, slotted as at 20. Extending into the slots 20, which are closed at the bottom, as at 21, are the outer ends of a squared shaft 22, of wood or the like, which has squared reduced portions 23 sliding in the slots 20.

24 are outwardly extending rounded portions adapted to receive any suitable wheels 25 of wood or the like, the wheels being confined by washers 26, 27, and a securing pin or dowel 28. The washers may be loose on the rounded end of the shaft. The inward movement of the inner washer is limited by the shoulder 29 of the squared portion 23, or may engage directly the outer side of the bracket 19.

Interposed between the shaft 22 and the vehicle itself is a spring structure which includes an upper leaf 30 and a lower leaf 31. The lower leaf 31 may have downwardly rounded abutments 32 which engage the top of the axle 22. The leaves 30, 31 have reduced end portions 33, which penetrate the channels 20 of the brackets 19. Thus endwise movement of the spring leaves is prevented. The spring leaves are also centered in the slot 18 in the keel piece 1. The spring connection between the axle 22 and the vehicle is the connection between the upper leaf 30 and the keel piece. The downward thrust from the vehicle is, therefore, exerted by the keel piece against the top of the upper leaf 30 and is carried by the leaves 30 and 31 through it about the connections 32 of the lower leaf 31, which engage the top of the axle 22.

Referring to the form of Figs. 7 and following, the structure is generally similar, but as will be observed in Figs. 8 and 10, the keel piece differs substantially.

The keel piece 40 is provided with an eye or aperture 41, at its forward end, through which passes a bolt 42, which extends downwardly through a caster 43, having a rearward downward extension 44, through which passes a pin 45 on the outer ends of which are mounted caster wheels 46. These are centered by inner and outer washers 47, 48, and the assembly is held together by cotters or locking elements 49 at the opposite ends of the pins. 50 is a supporting washer on the bolt or pin 42, which serves to separate the member 43 from the forward end of the keel piece 40. 51 is a horizontal bottom piece abutting against the under surface 52 of the keel member, and 53 is a forwardly extending foot board which is upwardly inclined toward the outer end of the keel piece. The top of the rear portion of the keel piece carries the seat 54, surrounded by the unitary side and rear element 55. 56 are side supports for the forward edges of the member 55, which are shown as extending downwardly along and may even form part of the member or members 57 which extends downwardly from the forward edge of the seat member 54 to the foot rest 51. The keel piece is notched, as at 58, for the springs, and terminates in an inclined rear surface 59, to which a handle 60 of any suitable shape or length may be bolted or otherwise secured. The supporting means for the rear wheels and the spring structure is identical with that shown in the form of Figs. 1 and following, and is similarly numbered in the drawings.

As an ornament and as a means for keeping a small child from falling from the vehicle, I may provide an upward projection from the keel piece, in the form of the element 65, herein shown as a conventional horse's head. The element 65 may be doweled, as at 66, to the top forward part of the keel piece 40.

It will be realized that, whereas I have described and illustrated a practical and operative device, nevertheless many changes may be made in the size, shape, number and disposition of parts without departing from the spirit of my invention. I therefore wish my drawings and description to be taken as in a broad sense illustrative or diagrammatic, rather than as a limitation to my precise showing.

It will be observed that practically the entire structure is of wood, including even the caster structure for the form of Figs. 7 and following. The axle and the spring structure for the rear wheels are of wood, and even the securing pins 28 at the end of the axle 22. Therefore, except for various washers, which may be of metal or fiber, and the bolts 8 and 42, the entire structure may be of wood. Even the forward axle 45, with its securing pins 49, may be of wood, and the wheels themselves, of course, may be of wood. The structures are efficient, economical and sightly, and are easily manufactured and easily assembled.

The hinge structure, while well adapted to children's vehicles of the type shown, may be applied to other vehicles, larger or smaller, such as toys, and may also be applied to furniture, chairs, and the like. Note that the support 15, may be hinged as at 15a, as shown in Fig. 2, and may be permitted to hang loose so that it will gravitally move into the supporting position in which it is shown in Fig. 2, but if it engages an obstruction while the carriage is being moved forward or backward, it will tilt to override the obstruction.

I claim:

1. In vehicles and the like, a horizontally extending keel piece lying in a generally vertical plane, a horizontally extending seat element mounted upon the upper surface of a rear portion of the keel piece, feet engaging supporting means secured to the lower surface of a forward portion of the keel piece, an axle extending transversely beneath the rear portion of the keel piece and spaced downwardly therefrom, a leaf spring interposed between the top of the axle and the keel piece, the bottom of the keel piece directly engaging the top of the intermediate portion of said spring, said spring having a sliding connection between its ends and the top of the axle, and centering means mounted on the seat and slotted to receive the ends of the axle and the spring, both axle and spring being normally out of contact with the ends of the slots, and wheels mounted on the outer ends of the axle, the weight of the rear portion of the vehicle being received by the spring and transmitted thereby to the ends of the axle.

2. In a vehicle and supporting means therefor, a vehicle body, an axle, ground engaging wheels rotatably mounted on said axle and a spring structure extending between said body and said axle including a lower spring leaf normally slidably engaging said axle at the end of the leaf and an upper leaf normally continuously engaging the upper side of the lower leaf along a substantial length, the leaves being free for relative longitudinal movement in response to the flexure of the leaf structure as a whole and a guide downwardly extending from the vehicle body, and having portions defining a generally vertical confining slot through which extends the axle and into which extend the spring leaves, the axle and the spring leaves being free for a substantial range of vertical movement in said slot.

3. In a vehicle and supporting means therefor, a vehicle body, an axle beneath said body, guiding means extending downwardly from said body and including portions defining generally vertical slots at each side of the vehicle body, the ends of the axle extending into said slots, ground engaging wheels rotatably mounted on the ends of said axle, the portions of the axle which extend into said slots having sides opposed to the sides of the slots, adapted to prevent rotation of the axle, a leaf spring interposed directly between the top of the axle and the vehicle body, abutment means extending between an intermediate portion of the top of the spring and the body, adapted to concentrate the weight of the body against the spring substantially midway between the ends of the spring, the ends of the spring extending into slots and being in sliding contact with the top of the axle.

4. In a vehicle and supporting means therefor, a vehicle body, an axle beneath said body, guiding means extending downwardly from said body and including portions defining generally vertical slots at each side of the vehicle body, the ends of the axle extending into said slots, ground engaging wheels rotatably mounted on the ends of said axle, the portions of the axle which extend into said slots having sides opposed to the sides of the slots, adapted to prevent rotation of the axle, a leaf spring interposed directly between the top of the axle and the vehicle body, abutment means extending between an intermediate portion of the top of the spring and the body, adapted to concentrate the weight of the body against the spring substantially midway between the ends of the spring, the ends of the spring being provided with downwardly extending abutment elements in slidable contact with the top of the axle.

5. In a spring structure of fibrous material, a supporting element, a supported element, a leaf spring interposed between the two elements and having contact members at its ends extending from the face of the spring, and engaging one of said elements, the other of said elements being in contact with the side of the spring opposite said contact members, at a point intermediate the ends of said spring and guiding means for the ends of said spring including guiding members mounted one one of said elements, and slotted to receive the ends of the spring, the spring ends being freely flexible in the slots of said slotted members, the other of said elements including portions extending into the slots of said slotted member.

6. In a child's vehicle, a body having a seat portion and a feet receiving portion extending to a level below the bottom of the seat portion, an axle extending transversely beneath the seat portion, a wheel located at each end of the axle, a spring extending between the body and said axle, said spring including an upper leaf and a lower leaf, said leaves being in contact on their abutting faces and being free for relative longitudinal movement in response to the flexure of the spring structure as a whole, said spring being supported at its ends on said axle.

7. In a child's vehicle, a body having a seat portion and a feet receiving portion extending to a level below the bottom of the seat portion, an axle extending transversely beneath the seat portion, a wheel located at each end of the axle, a spring extending between the body and said axle, said spring including an upper leaf and a lower leaf, said leaves being in contact on their abutting faces and being free for relative longitudinal movement in response to the flexure of the spring structure as a whole, said spring being supported at its ends on said axle, the axle being normally located at a level somewhat above the level of the feet supporting portion of the body, and being located rearwardly thereof.

PAUL M. RESSINGER.